(12) United States Patent
L'Heritier et al.

(10) Patent No.: US 9,493,229 B2
(45) Date of Patent: Nov. 15, 2016

(54) RETRACTABLE EQUIPMENT SYSTEM INCLUDING A DEVICE OPTIMIZED FOR DRIVING PROTECTION FLAPS

(71) Applicant: AIRBUS OPERATIONS (S.A.S.), Toulouse (FR)

(72) Inventors: Michel L'Heritier, Colomiers (FR); Eric Doustens, Fonsorbes (FR); Philippe Bosc, L'Union (FR); Philippe Castagne, La Primaube (FR)

(73) Assignee: Airbus Operations (S.A.S.), Toulouse (FR)

( * ) Notice: Subject to any disclaimer, the term of this patent is extended or adjusted under 35 U.S.C. 154(b) by 386 days.

(21) Appl. No.: 14/092,194

(22) Filed: Nov. 27, 2013

(65) Prior Publication Data

US 2014/0158824 A1 Jun. 12, 2014

(30) Foreign Application Priority Data

Nov. 30, 2012 (FR) ..................................... 12 61490

(51) Int. Cl.
*B64D 47/00* (2006.01)
*B64C 7/00* (2006.01)
*G03B 15/00* (2006.01)
*B64D 47/08* (2006.01)

(52) U.S. Cl.
CPC ................. *B64C 7/00* (2013.01); *B64D 47/00* (2013.01); *B64D 47/08* (2013.01); *G03B 15/006* (2013.01)

(58) Field of Classification Search
CPC .............. B64C 7/00; B64C 2201/123; B64C 2201/127; B64C 25/16; B64D 7/00; B64D 7/06; B64D 43/00; B64D 45/00; B64D 47/00; B64D 47/08; G03B 15/006

USPC ................................................. 396/7, 12, 13
See application file for complete search history.

(56) References Cited

U.S. PATENT DOCUMENTS

| 1,979,011 | A | * | 10/1934 | Potez | B64D 7/06 244/118.6 |
|---|---|---|---|---|---|
| 2,242,201 | A | * | 5/1941 | Woods | B64D 47/08 244/118.1 |
| 2,661,171 | A | * | 12/1953 | Allen | B64C 25/26 244/102 SL |
| 2,702,346 | A | * | 2/1955 | Evans | H01Q 1/428 343/705 |
| 2,921,501 | A | * | 1/1960 | Parot | B64D 1/04 244/129.5 |

(Continued)

OTHER PUBLICATIONS

Gunston; "Cam," "Cam Follower"; The Cambridge Aerospace Dictionary; 2009; 2nd Edition; p. 123.*

(Continued)

*Primary Examiner* — Tien Dinh
*Assistant Examiner* — Michael A Fabula
(74) *Attorney, Agent, or Firm* — Jenkin, Wilson, Taylor & Hunt, P.A.

(57) ABSTRACT

A system for retractable equipment including movable protection flaps in which a flap drive device serves to drive the flaps in optimized movement, providing a mechanical coupling between the flaps and the retractable equipment such that a common motor member can be used for driving both the equipment and the flaps between respective retracted and deployed positions. The flap drive device includes a cam in the form of a sliding channel secured to a frame of the system and a cam follower in the form of a translating pivot mechanically coupled to both the retractable equipment and a flap drive member. The path followed by the retractable equipment is accordingly optimized.

10 Claims, 7 Drawing Sheets

(56) References Cited

U.S. PATENT DOCUMENTS

| | | | | |
|---|---|---|---|---|
| 2,984,834 A * | 5/1961 | Howard, Jr. | ............... | B64C 1/36 244/102 R |
| 3,656,164 A * | 4/1972 | Rempt | ................... | H01Q 1/428 343/705 |
| 4,176,812 A * | 12/1979 | Baker | ................... | B64C 1/1407 182/77 |
| 4,188,631 A * | 2/1980 | Dougherty | ................ | B64C 1/36 343/705 |
| 4,593,288 A * | 6/1986 | Fitzpatrick | ................ | B64C 1/36 244/118.1 |
| 5,257,758 A * | 11/1993 | Hassel | ..................... | B64D 7/08 244/129.4 |
| 5,482,228 A * | 1/1996 | Hoshino | ................ | B64C 25/50 244/102 A |
| 5,927,648 A * | 7/1999 | Woodland | ............ | B64C 1/1415 244/118.1 |
| 5,969,686 A * | 10/1999 | Mackenzie | .............. | H01Q 1/42 343/705 |
| 6,564,690 B1 * | 5/2003 | Long | ........................ | B64D 7/06 224/181 |
| 8,137,007 B1 | 3/2012 | Harvey | | |
| 8,849,105 B2 * | 9/2014 | Cury | .................... | G03B 17/561 396/12 |
| 2003/0071170 A1 * | 4/2003 | Hilbert | ..................... | B64C 1/20 244/118.1 |
| 2005/0029399 A1 | 2/2005 | Lowe | | |
| 2012/0251092 A1 * | 10/2012 | Zwaan | ................. | B64C 39/024 396/428 |

OTHER PUBLICATIONS

French Search Report for Application No. FR 1261490 dated Jul. 25, 2013.

* cited by examiner

RETRACTABLE EQUIPMENT SYSTEM INCLUDING A DEVICE OPTIMIZED FOR DRIVING PROTECTION FLAPS

TECHNICAL FIELD

The present invention relates to the field of retractable equipment for aircraft, and more particularly it relates to actuating such equipment together with flaps for protecting the equipment.

The invention is intended in particular for remote detection equipment, such as optronic sensors.

BACKGROUND

It is known to fit aircraft with remote detection equipment.

When such equipment is arranged in a high portion of an aircraft, the equipment can be mounted so as to remain in position. This applies for example to optronics pods for certain fighter airplanes.

In contrast, when the equipment is arranged on a low portion of an aircraft, e.g. under the wings or under the fuselage, it is desirable for the equipment to be retractable into a compartment having movable protection means, such as one or more flaps, suitable for protecting the equipment from possible projectiles while the equipment is not in operation, and in particular while running along a runway during takeoff and landing.

The protection means generally require dedicated drive means for driving them, i.e. means that are independent of the means for driving the equipment itself, and such dedicated means are found to be penalizing in terms of weight, of fabrication costs, of maintenance costs, and of overall size.

There thus exists a need for a drive device that is compact, lightweight, and inexpensive.

SUMMARY

To this end, the invention provides a system for an aircraft, the system comprising:
  a frame for mounting on an aircraft structure;
  equipment movable relative to said frame along a predetermined path between a "retracted" position and a "deployed" position;
  protection means movable between a first position in which said protection means intercept said path of said equipment in order to protect it, and a second position in which said protection means are spaced apart from said path in order to allow said equipment to pass therealong; and
  at least one drive device for driving said protection means between said first and second positions.
  According to the invention, the drive device comprises:
  a cam secured to said frame;
  a cam follower co-operating with said cam;
  a drive member connected to said protection means so as to drive them between said first and second positions;
  first coupling means mechanically coupling said cam follower to said equipment; and
  second coupling means mechanically coupling said cam follower to said drive member.

Furthermore, said cam, said first coupling means, and said second coupling means are configured in such a manner that said cam follower converts straight-line movement of said equipment along said path into straight-line movement of said drive member in such a manner that the ratio of the respective speeds of said drive member and of said equipment varies during the movement of said equipment.

In conventional manner, the term "cam follower" designates an element that is constrained to remain in contact with said cam.

The drive device thus makes it possible to provide mechanical coupling between said equipment and said protection means so that a single motor member can be used for driving both said equipment and also the protection means.

The variation in the ratio of the respective speeds of the drive member and of the equipment that is obtained by the drive device makes it possible to optimize synchronization between the respective movements of the equipment and of the protection means.

In particular, it is thus possible to cause the protection means to move relatively quickly from their first position towards their second position so as to ensure that the protection means do not constitute an obstacle to the passage of the equipment while it is being deployed. In analogous manner, the movement of the protection means from their second position towards their first position can be caused to take place for the most part or entirely during a final part of the equipment retraction stroke.

Consequently, the invention allows the equipment in the "retracted" position to be relatively close to the protection means in their first position, and the invention makes it possible to limit the extent to which the protection means need to be spaced away from the path of the equipment when the protection means are in their second position.

Preferably, said cam, said first coupling means, and said second coupling means are configured to couple the movement of said drive member with the movement of said equipment when the equipment lies between its "retracted" position and a predetermined intermediate position, and to decouple the movements of said drive member and of said equipment when said equipment lies between said predetermined intermediate position and its "deployed" position.

During the deployment of said equipment, the drive device thus enables the protection means to move from their first position towards their second position while the equipment is passing from its "retracted" position to said intermediate position, and it the enables the protection means to be held in their second position while the equipment is passing from said intermediate position to its "deployed" position.

In analogous manner, during retraction of the equipment, the drive device enables the protection means to be held in their second position while the equipment is passing from its "deployed" position to said intermediate position, after which it enables the protection means to move from their second position towards their first position while the equipment is passing from said intermediate to its "retracted" position.

The decoupling of the respective movements of the drive member and of the equipment should not be understood as meaning that these two elements are mechanically decoupled. On the contrary, the cam and the first and second coupling means serve to maintain a mechanical connection between the drive member and the equipment even when their movements are decoupled. This mechanical connection makes it possible to control the position of the drive member all along the stroke of the equipment.

In a preferred embodiment of the invention:
  said cam is formed by a first slideway secured to said frame;

said second coupling means comprise a second slideway movable in parallel with said path of said equipment; and said cam follower is engaged simultaneously in said first and second slideways.

Under such circumstances, the shape of the first and second slideways makes it possible to define the transfer function that defines the straight-line movement of the drive member as a function of the straight-line movement of the equipment.

In a preferred embodiment of the invention, said first slideway has a first portion extending parallel to said path of said equipment, a second portion extending orthogonally to said path of said equipment, and a curved portion serving to enable said cam follower to be guided from one to the other of said first and second portions.

The first portion of the first slideway defines a path for the cam follower that is parallel to said path of said equipment, while the second portion of the first slideway defines a path of the cam follower that is orthogonal to said path of said equipment.

In addition, said second slideway preferably extends orthogonally to said path of said equipment.

The first portion of the first slideway defines a path of the cam follower in which the cam follower drives the second slideway and thus the drive member under the effect of the equipment moving.

The second portion of the first slideway defines a path of the cam follower in which the cam follower holds the second slideway stationary, together with the drive member, independently of any movement of the equipment.

The system advantageously includes a support on which said equipment is mounted.

The support is preferably provided with hinge means.

In addition, said first coupling means advantageously comprise a connecting rod having a first end hinged to said hinge means of said support, and a second end hinged to said cam follower.

In co-operation with the cam, the connecting rod makes it possible to cause the cam follower to be driven parallel to the path followed by the support during the movement of said equipment, when the support is situated in a first portion of said path, and it enables the cam follower to be blocked in the direction of said path when the support is situated in a second portion of its path.

Said connecting rod is preferably designed in such a manner that its two ends are movable relative to each other. This makes it possible in particular to shorten the length of the above-mentioned second portion of the first slideway while avoiding risks of the connecting rod jamming during the movement of said equipment.

Under such circumstances, the connecting rod advantageously includes resilient means interconnecting its two ends so as to damp any vibration between said ends. By way of example, these resilient means may be formed by a double-acting spring.

In a preferred embodiment of the invention, said hinge means of said support are arranged in such a manner that the orthogonal projection of a hinge axis of said first end of said connecting rod onto a line parallel to said second portion of said first slideway is offset from a hinge axis of said second end of said connecting rod in a direction going from said second portion towards said first portion of said first slideway, when said protection means are in said first position.

In a variant, the first coupling means may comprise a cam secured to said support and co-operating with said cam follower in such a manner as to drive the cam follower under the effect of said equipment moving, at least when the equipment is in a predetermined portion of said path.

Under such circumstances, said cam secured to the frame and said cam secured to the support act to determine the path followed by the cam follower during movement of said equipment.

In general, said protection means are preferably movable in turning about an axis orthogonal to said path of said equipment.

Furthermore, said protection means advantageously comprise two flaps movable in turning about a common axis of rotation and in respective opposite directions.

Furthermore, said drive device preferably comprises two first arms hinged together to said second coupling means by means of a pivot forming said drive member, together with two second arms having:

respective first end portions hinged respectively to said first arms;

respective second end portions fastened respectively to the two flaps of said system; and respective middle portions hinged together to said frame in such a manner as to pivot about a common hinge axis such that said second arms form a scissors mechanism.

The second arms thus form a scissors type mechanism. Spacing apart the respective first end portions of the second arms causes the respective second end portions of the second arms to be spaced apart because of the respective middle portions of the second arms being hinged together to said frame. In analogous manner, movement of the above-mentioned first end portions towards each other causes the above-mentioned second end portions to move towards each other.

The second arms thus make it possible to alternate between moving the two flaps forming said protection means between moving apart from each other and moving towards each other.

Furthermore, the first arms make it possible to convert the straight-line movement of the drive member into the above-described movement of the second arms moving apart and moving towards each other.

In a variant, said drive member may be formed by a rack extending in the direction of the path of said equipment and co-operating by meshing with two pinions secured respectively to the two above-mentioned flaps and movable in rotation about the common axis of rotation of the flaps.

In general, said equipment comprises an optronic sensor, for example.

In a variant, the equipment may comprise any other type of sensor or detector, or indeed any other type of equipment.

Furthermore, each of said flaps is preferably in the form of a portion of a sphere.

In their first position, the two flaps can thus together form a dome or a portion of such a dome.

This configuration is particularly advantageous when the above-mentioned equipment includes an element of spherical shape, such as an optronics pod.

The invention also provides an aircraft having at least one system of the above-described type.

In a preferred embodiment of the invention, said protection means of said system close an opening formed in a fairing of said aircraft when said protection means are in said first position.

The fairing may in particular form a portion of the fuselage or of the wings of an aircraft, or indeed of a landing gear nacelle fitted to the fuselage of an aircraft.

BRIEF DESCRIPTION OF THE DRAWINGS

The invention can be better understood and other details, advantages, and characteristics thereof appear on reading the following description made by way of non-limiting example and with reference to the accompanying drawings, in which.

DETAILED DESCRIPTION OF THE INVENTION

Figure 1:
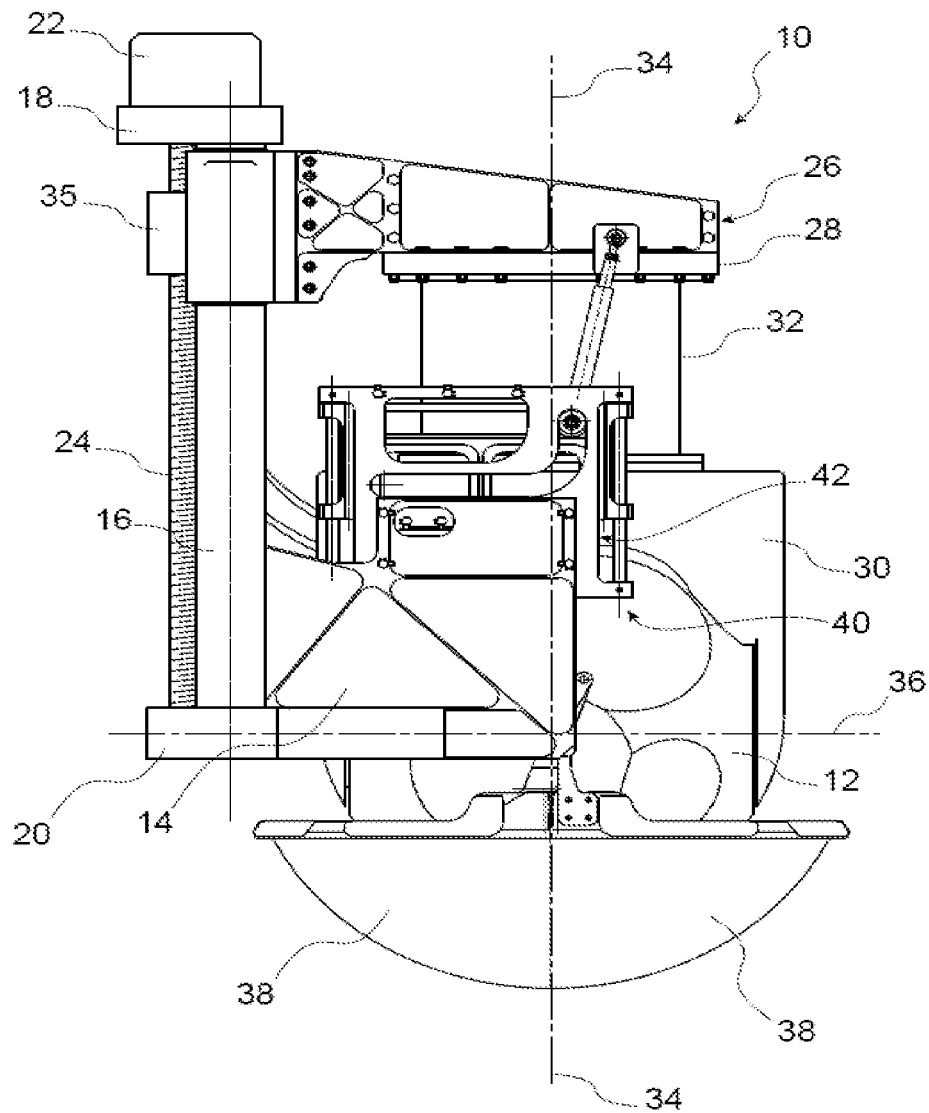
FIG. 1 is a fragmentary diagrammatic side view of a system comprising retractable equipment and means for protecting it, in a preferred embodiment of the invention, shown with said equipment in a retracted state.
Figure 2:
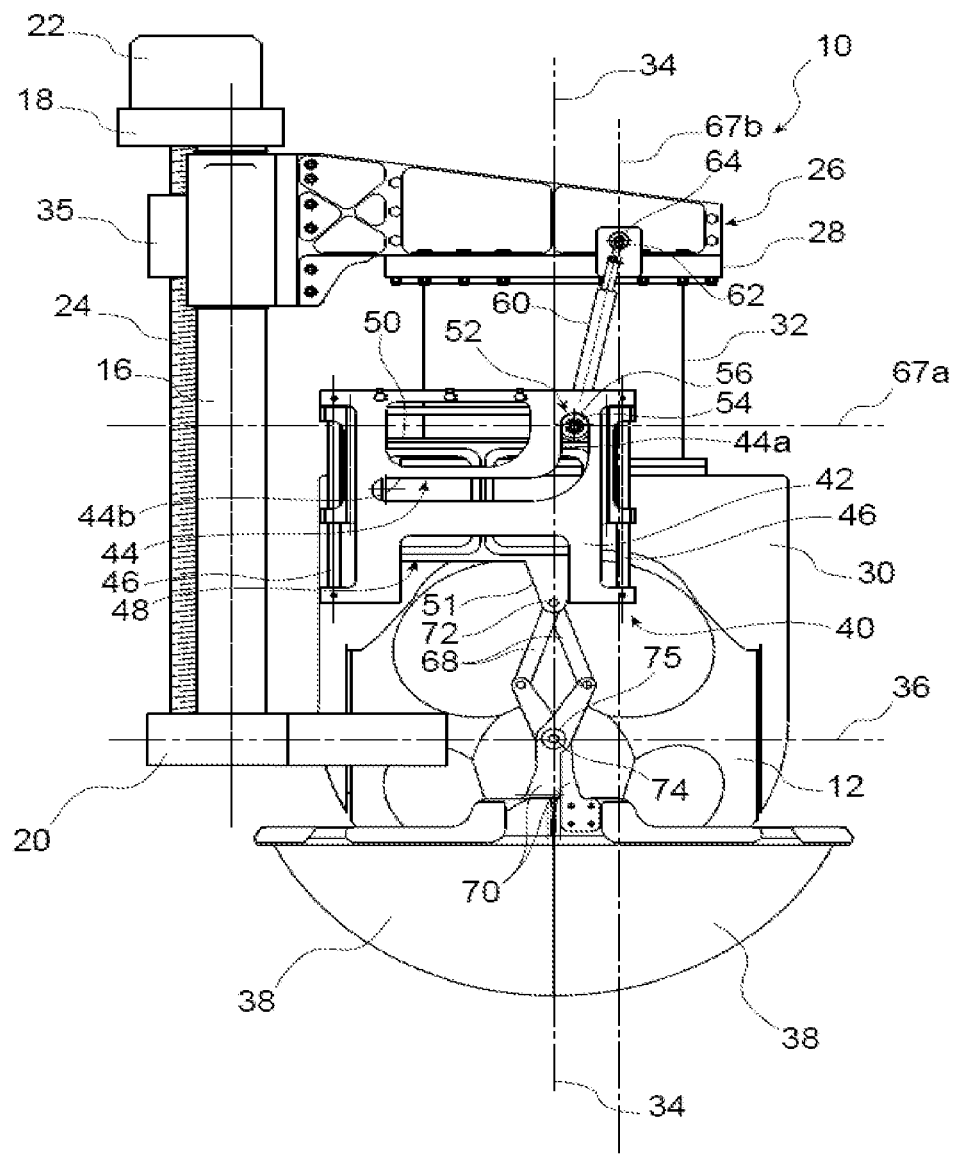
FIG. 2 is a view similar to FIG. 1, in which a side plate of the frame is omitted in order to reveal a drive device for driving the protection means.
Figure 3:
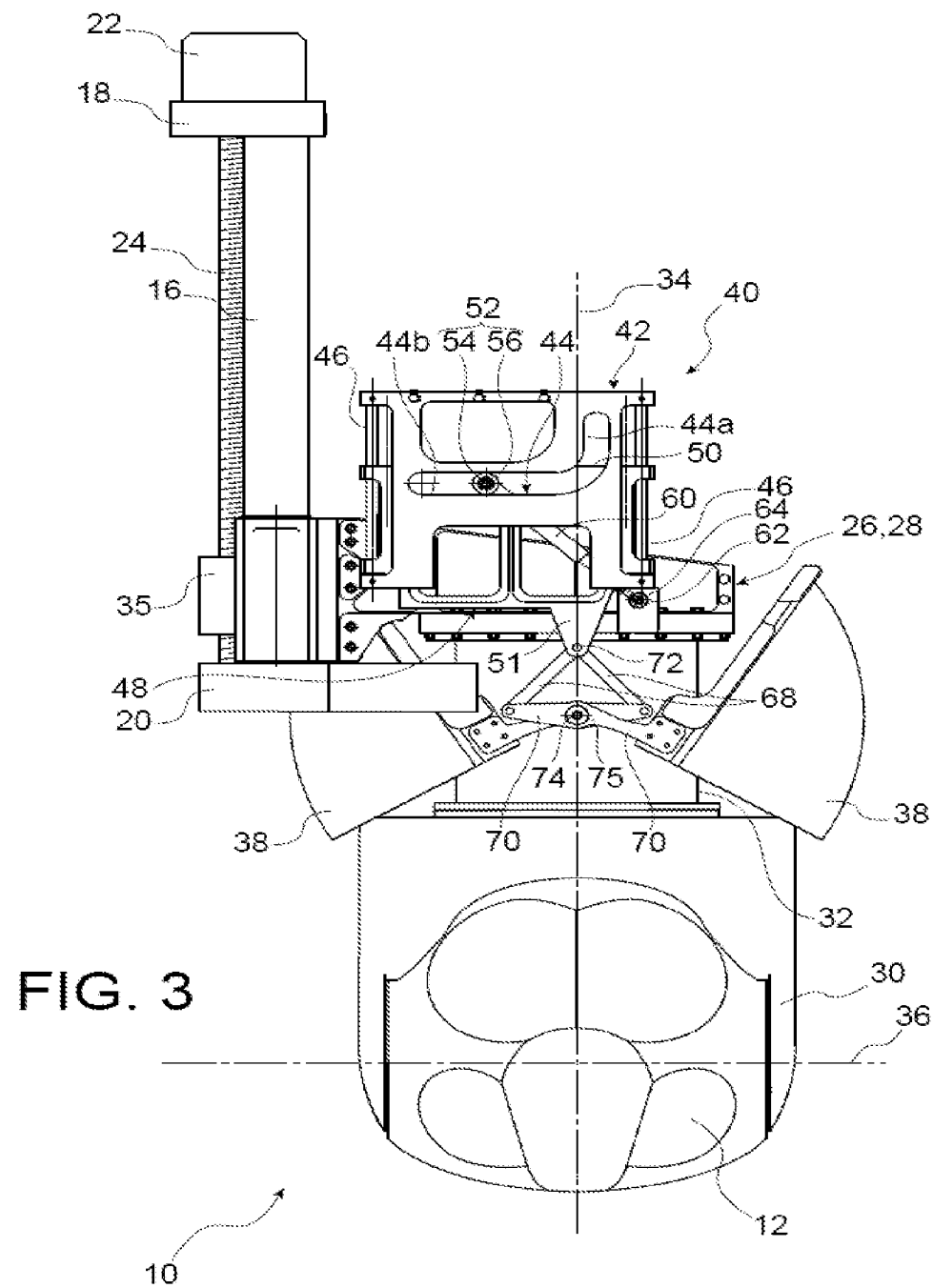
FIG. 3 is a view similar to FIG. 2, showing the system in a deployed state of said equipment.

FIGS. 1 to 3 show an aircraft system 10 comprising retractable equipment, e.g. constituted by an optronic sensor 12 of the type that can be referred to as an "optronic pod".

By way of example, the system 10 is for housing in a landing gear nacelle of a military transport airplane, as can be seen more clearly below.

The system 10 comprises a frame having in particular two laterally-arranged columns 16, one of which is hidden by the other in FIGS. 1 to 3, together with a top platform 18 (FIG. 1) fastened to the respective top ends of the columns 16, and a bottom platform 20 (FIG. 2) fastened to the respective bottom ends of the columns 16. The platforms 18 and 20 extend orthogonally to the columns 16. The frame also has two side plates 14 fastened to the bottom platform 20, one of which is visible in FIG. 1, these side plates being omitted in the other figures for reasons of clarity.

The system 10 also has a motor 22 mounted on the top platform 18, together with a threaded rod 24 coupled to a rotor of the motor 22 and extending parallel to the columns 16. The threaded rod 24 has smooth end portions that are rotatably mounted respectively in two respective orifices in the platforms 18 and 20.

The system 10 also has a support 26 comprising a movable platform 28 mounted to slide on the columns 16, together with a fork mount 30 fastened on a support column 32, itself mounted on a bottom face of the movable platform 28 so as to enable the support column 32 to turn about a first axis of rotation 34 parallel to the columns 16.

The optronic sensor 12 is mounted on the fork mount 30 in such a manner as to enable the optronic sensor to turn about a second axis of rotation 36 orthogonal to the first axis of rotation 34.

The movable platform 28 has a tapped orifice or nut 35 into which the threaded rod 24 is screwed so as to enable the support 26 to be driven in translation along the columns 16 by a "lead-screw" type effect between a position in which the optronic sensor is retracted (FIGS. 1 and 2) and a position in which the optronic sensor is deployed (FIG. 3).

The system 10 also has two flaps 38, each in the form of one-fourth of a sphere, together with two drive devices 40 enabling the flaps 38 to be driven between a first position (FIGS. 1 and 2) and a second position (FIG. 3) in a manner that is synchronized with the movement of the support 26, as can be seen more clearly below. In their first position, the flaps 38 serve substantially to close an opening formed in a fairing forming part of the above-mentioned landing gear nacelle and designed to allow the optronic sensor 12 to pass therethrough. It should be observed that the two drive devices 40 are arranged on either side of the system 10, so that one of these drive devices is masked in FIGS. 1 to 3.

In the first position (FIGS. 1 and 2) the flaps 38 are substantially in contact with each other and they are arranged facing the optronic sensor 12, which is in its "retracted" position. The flaps 38 thus intercept the path followed by the optronic sensor 12 on moving between its "retracted" position and its "deployed" position.

In the second position (FIG. 3), the flaps 38 are spaced apart from each other and they are arranged on either side of the optronic sensor 12, which is in its "deployed" position. The flaps 38 are then spaced apart from the path followed by the optronic sensor 12.

The two drive devices 40 are similar to each other and they are arranged on either side of the support 26. These devices are described below in greater detail with reference to FIGS. 2 and 3, which show one of the drive devices 40 incorporated in the system 10, and with reference to FIGS. 4 and 4a to 4c, which show the drive device in isolation from the remainder of the system 10.

The drive device 40 has a main cheekplate 42 fastened to the corresponding side plate 14 (see FIG. 1), and a secondary cheekplate 43 fastened to a top end of the main cheekplate 42, spaced apart therefrom, and facing it.

The cheekplates 42 and 43 have two similar respective slideways 44 (see the other figures), each referred to as a "first" slideway in the terminology of the invention, and each having a first portion 44a extending parallel to the columns 16, a second portion 44b extending orthogonally to the columns 16, and a curved portion connecting together the first and second portions 44a and 44b. Furthermore, two guide rods 46 that extend parallel to the columns 16 are fastened respectively to the sides of the main cheekplates 42.

The drive device 40 also has a slideplate 48 extending between the main cheekplate 42 and the secondary cheekplate 43. This slideplate 48 has lateral ends mounted respectively on the guide rods 46 so as to enable the slideplate 48 to slide along the guide rods 46. The slideplate 48 includes a slideway 50 referred to as a "second" slideway in the terminology of the invention, formed in a top portion of the slideplate and extending orthogonally to the columns 16, and a lug 51 formed in a bottom portion of the slideplate 48.

The drive device 40 also has a slider 52 comprising a pivot 54, two first wheels 56 (FIG. 4) mounted on the pivot 54 and engaged respectively in the respective first slideways 44 of the cheekplates 42 and 43, and a second wheel 58 mounted on the pivot 54 and engaged in the second slideway 50 of the slideplate 48. The second wheel 58 is thus arranged between the two first wheels 56.

Figure 4:
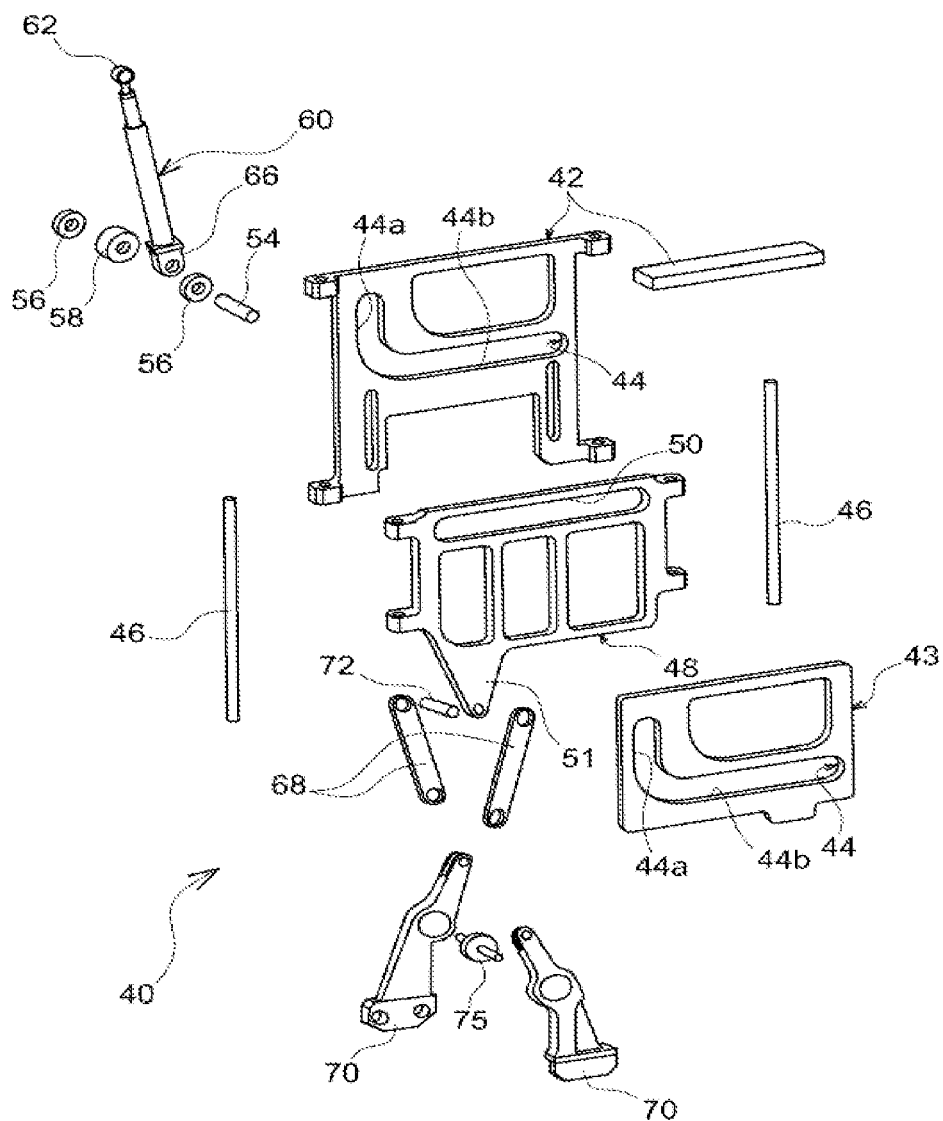
FIG. 4 is an exploded fragmentary diagrammatic view in perspective of the drive device for driving the protection means of said equipment, the drive device being shown on its own.
Figure 4A:
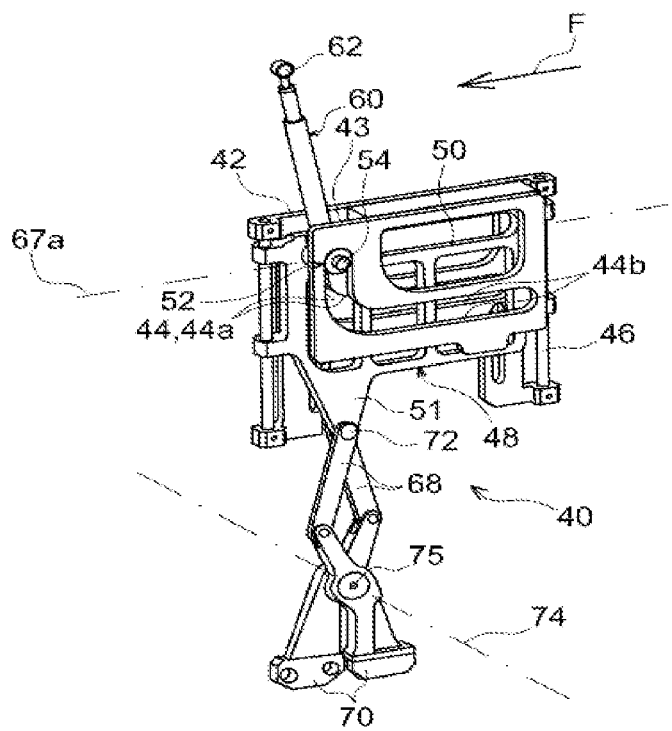
FIGS. 4a, 4b, and 4c are fragmentary diagrammatic views in perspective of the FIG. 4 drive device, respectively showing three states of the drive device corresponding respectively to the retracted state, to an intermediate state, and to the deployed state of said equipment.
Figure 4B:
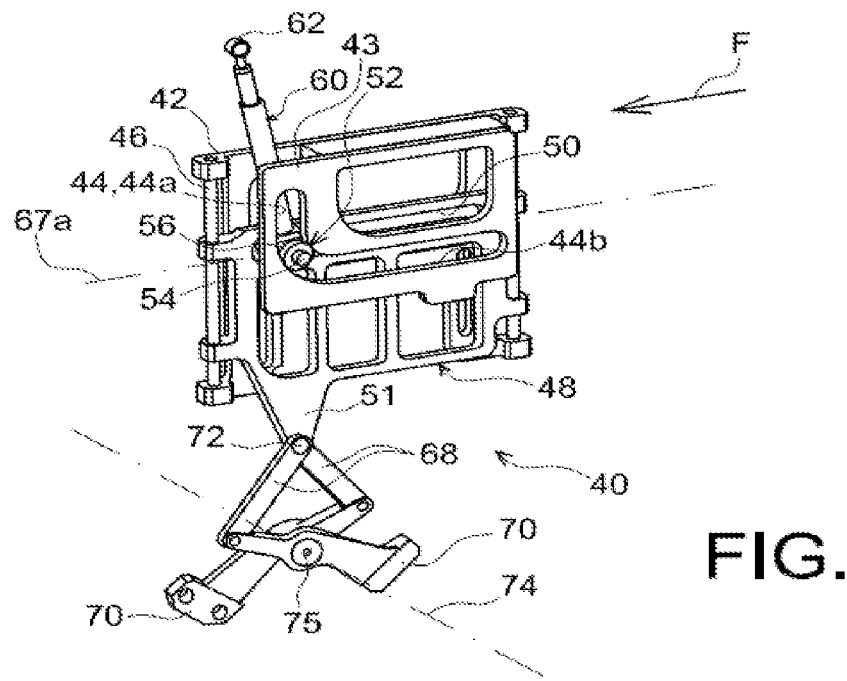
Figure 4C:
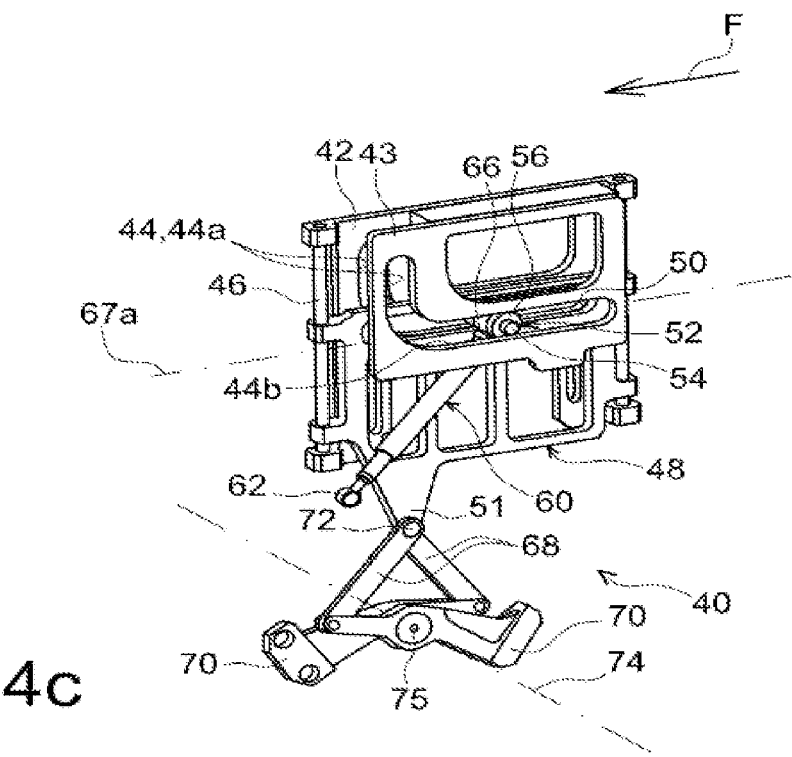

The drive device 40 also has a connecting rod 60 with a first end 62 (FIGS. 2 and 3) hinged to a pivot 64 mounted on a side face of the movable platform 28, and an opposite second end 66 hinged to the pivot 54 of the slider 52 (FIG. 4c). In the example shown, the second end 66 of the connecting rod is interposed between the second wheel 58 and the first wheel 56 that is engaged in the first slideway 44 of the secondary cheekplate 43.

It should be observed that the pivot 64 forms hinge means in the terminology of the invention. Furthermore, the pivots 54 and 64 define respective hinge axes for the first and second ends 62 and 66 of the connecting rod 60.

In the example shown, the connecting rod 60 is designed to damp vibration between its two ends 62 and 66. For this purpose, these two ends of the connecting rod are slidably mounted relative to each other and resilient damper means are interposed between these two ends of the connecting rod, inside it. These resilient damper means may for example be in the form of a double-acting spring.

When the optronic sensor 12 is in its "retracted" position (FIG. 2), the hinge axis of the first end 62 of the connecting rod 60 as defined by the pivot 64 is offset from the hinge axis defined by the pivot 54 of the slider 52 in the direction represented by arrow F, i.e. in the direction going from the second portion 44b towards the first portion 44a of each first slideway 44. More precisely, the vertical projection of the hinge axis defined by the pivot 64 onto a line 67a parallel to the second portion 44b of each first slideway 44 and passing through the hinge axis defined by the pivot 54 is offset relative to this latter hinge axis in the direction of arrow F. It should be observed that this vertical projection of the hinge axis defined by the pivot 64 is located where the line 67a intersects a line 67b parallel to the columns 16 and passing through this latter hinge axis (FIG. 2).

This property remains true throughout the deployment and retraction process. In particular, this property remains true during deployment, when the first wheels 56 of the slider 52 leave the curved portion and enter the second portion 44b of each first slideway 44. This makes it possible to guarantee that the connecting rod 60 continues to push the slider 52 further along the respective second portions 44b of the first slideways 44 until the first end 62 of the connecting rod 60 crosses the line 67a, as can be seen more clearly below.

The drive device 40 also has two first arms 68 and two second arms 70.

The respective top ends of the first arms 68 are hinged on a common pivot 72 mounted in the lug 51 of the slideplate 48. The respective bottom ends of the first arms 68 are hinged respectively to the respective top ends of the second arms 70. The second arms 70 have respective middle portions mounted to pivot about a common hinge axis 74 (FIGS. 4a to 4c) defined by a pivot 75, itself mounted on the corresponding side plate 14 (a part of which is visible in FIGS. 2 and 3). The second arm 70 has respective bottom ends fastened respectively to the two flaps 38 (FIGS. 2 and 3).

It should be observed that the hinge axis 74 of the second arms 70 preferably extends parallel to a longitudinal direction of the aircraft fitted with the system 10. Thus, the movement of the flaps 38 takes place substantially orthogonally relative to the relative wind when the aircraft is in flight.

The operation of the system 10 is described below.

When the system is in the state corresponding to FIG. 2, the optronic sensor 12 is retracted and the flaps 38 are in their first position, facing the optronic sensor, so as to protect it from any impacts against obstacles or projectiles.

In this state, the drive device 40 is as shown in FIG. 4a. In particular, each first wheel 56 of the slider 52 is arranged substantially at the top end of the first portion 44a of the corresponding first slideway 44.

The optronic sensor 12 is deployed by means of a command for setting the motor 22 into operation so as to turn the threaded rod 24 in a direction suitable for causing the support 26 to move towards the bottom 20, by the lead-screw effect.

The movable platform 28 then drives the first end 62 of the connecting rod 60 along a straight-line path parallel to the columns 16.

Simultaneously, each first wheel 56 of the slider 52 is guided along the corresponding first slideway 44.

In a first stage of the deployment, each first wheel 56 moves downwards along the first portion 44a of the corresponding first slideway 44, and it then moves along the curved portion thereof, thereby driving the second wheel 58 of the slider 52 downwards and thus the slideplate 48 together with the pivot 72 mounted through the lug 51 of the slideplate 48. The downward movement of the pivot 72 causes the bottom ends of the first arms 68 to move apart from each other, thereby causing the bottom ends of the second arms 70 in turn to move apart from each other by a scissors movement effect, thereby causing the flaps 38 to move apart from each other.

FIG. 4b shows the drive device 40 when each first wheel 56 is in the curved portion of the corresponding first slideway 44.

Under the effect of the downward movement of the first end 62 of the connecting rod 60, the first wheel 56 continues to travel until it enters into the second portion 44b of the first slideway 44. This moment marks the transition into a second stage of deployment, in which the slideplate 48 ceases to move, given the orientations of the first slideways 44 and of the second slideway 50. The flaps 38 have then reached their second position.

Driven by the threaded rod 24, the movable platform 28 continues to drive the first end 62 of the connecting rod 60 downwards, thereby tending to push each first wheel 56 further into the second portion 44b of the corresponding first slideway 44.

When the first end 62 of the connecting rod 60 crosses the line 67a orthogonal to the columns 16 and passing via the hinge axis defined by the pivot 54 of the slider 52, the travel direction of each first wheel 56 in the second portion 44b of each first slideway 44 reverses. Specifically the downward movement of the first end 62 of the connecting rod 60 then tends to pull each first wheel 56 in the direction of arrow F.

Deployment terminates before each first wheel 56 reaches the curved portion of the corresponding first slideway 44.

The drive device is then in the state shown in FIG. 4c, and the optronic sensor 12 is deployed, the support 26 extending between the flaps 38, as shown in FIG. 3.

The optronic sensor 12 is retracted by means of a command to set the motor 22 into operation so as to turn the threaded rod 24 in a direction serving to move the support 26 towards the top platform 18 by the lead-screw effect.

The drive device 40 then moves in opposite manner to the above description. Thus, in a first stage of retraction, the slideplate 48 remains stationary so that the flaps 38 remain spaced apart and to allow the optronic sensor 12 to pass between them, after which in a second stage of retraction, the slideplate 48 is driven upwards by the slider 52 and causes the flaps 38 to move until they reach their first position as shown in FIG. 2.

It can clearly be seen that the drive device optimally synchronizes the movements of the support 26 and of the flaps 38. More precisely, the slider 52 serves to convert straight-line movement of the support 26, and thus of the optronic sensor 12, into straight-line movement of the pivot 72 passing through the lug 51 of the slideplate 48, while allowing the ratio of the respective speeds of the pivot 72 and of the support 26 to be varied.

The curve showing variation of this speed ratio along the stroke of the support 26 is determined in particular by the shape of the first slideways 44 which together form a cam, and by the shape of the second slideway 50. The slider 52 thus forms a cam follower, in the terminology of the invention.

Furthermore, in the terminology of the invention, the connecting rod 60 forms first coupling means, while the slideplate 48 forms second coupling means, and the pivot 72 passing through the lug 51 of the slideplate 48 forms a drive member.

In general, the motor 22 (FIG. 1) enables the support 26 of the optronic sensor 12 and also the flaps 38 to be driven with respective optimum movements.

Figure 5A:
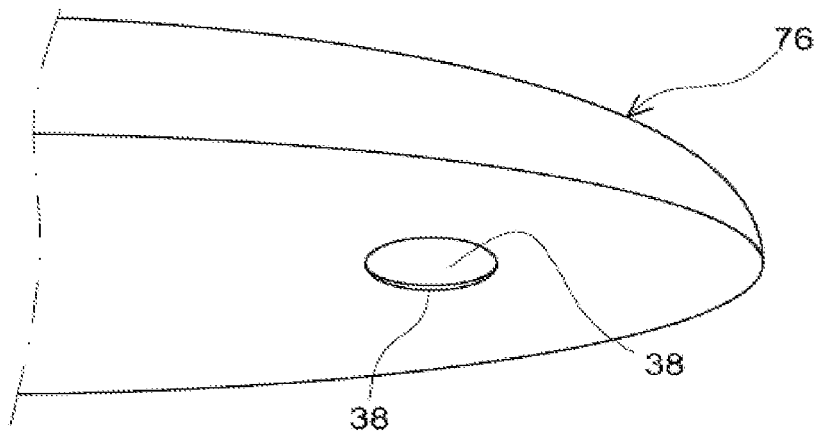
FIGS. 5a and 5b are fragmentary diagrammatic views in perspective as seen from below showing an aircraft landing gear nacelle including the system of the above figures.
Figure 5B:
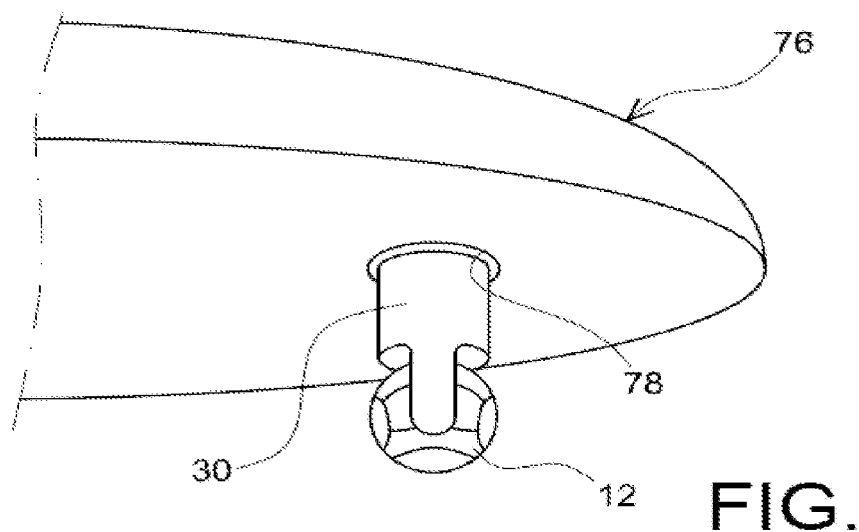

FIGS. 5a and 5b show a rear landing gear nacelle 76 of a military transport airplane in which a system 10 of the above-described type can be housed.

FIG. 5a shows the system 10 with the optronic sensor in its "retracted" position, only the flaps 38 being visible from outside the nacelle 76. These flaps are in their first above-mentioned position, thereby forming a dome that projects through an orifice 78 provided in a bottom portion of the nacelle 76. The flaps 38 thus substantially close the orifice 78.

FIG. 5b shows the optronic sensor 12 in the "deployed" position. Under such circumstances, the flaps 38 are retracted into the inside of the nacelle 76, being spaced apart on either side of the above-mentioned orifice 78, and the fork mount 30 projects through the orifice 78.

In a variant, the coupling between the support 26 and the slider 52 need not be provided by a connecting rod as described above, and may instead be provided with an additional slideway secured to the support 26 and having the slider 52 engaged therein. By way of example, such a slideway may be formed in a cheekplate extending downwards from the movable platform 28. The additional slideway presents a shape in the form of a straight line sloping relative to the direction of the second portion 44b of each first slideway 44 going upwards and away from the first portion 44a towards the second portion 44b of each first slideway 44. The slider 52 thus remains stationary relative to the additional slideway when it is in the first portion 44a of each first slideway. The slider 52 is then driven together with the support 26 and it drives the slideplate 48 in turn. In contrast, when the slider 52 is in the second portion 44b of each first slideway 44, the slider moves in the additional slideway so as to allow the support 26 to continue moving while preventing the slideplate 48 from moving relative to the frame.

In general, the above-described system 10 proposes a technique for deploying and retracting equipment 12 in the vertical direction relative to an aircraft. Nevertheless, it can clearly be seen that the operation of the system 10 is independent of its orientation. The system 10 can thus be positioned so as to enable the equipment 12 to be deployed along some other direction without going beyond the ambit of the invention.

The invention claimed is:

1. A system for an aircraft, the system comprising:
a frame configured for mounting on an aircraft structure;
equipment configured to move, by an actuator, relative to the frame along a predetermined path between a retracted position and a deployed position;
a protection structure configured to move between a first position, in which the protection structure intercepts the predetermined path of the equipment to protect the equipment, and a second position, in which the protection structure is spaced apart from the predetermined path to allow the equipment to pass along the predetermined path; and
at least one drive device configured to drive the protection structure between the first and second positions,
wherein the at least one drive device comprises:
a cam secured to the frame;
a cam follower configured to cooperate with the cam;
a drive member connected to the protection structure so as to drive the protection structure between the first and second positions;
a first coupler configured to mechanically couple the cam follower to the equipment; and
a second coupler configured to mechanically couple the cam follower to the drive member; and
wherein the cam, the first coupler, and the second coupler are configured such that the cam follower converts a straight-line movement of the equipment along the predetermined path into a straight-line movement of the drive member such that a ratio of respective speeds of the drive member and of the equipment varies during the straight-line movement of the equipment.

2. The system of claim 1, wherein the cam, the first coupler, and the second coupler are configured to couple the straight-line movement of the drive member with the straight-line movement of the equipment when the equipment lies between the retracted position and a predetermined intermediate position and to decouple the straight-line movements of the drive member and of the equipment when the equipment lies between the predetermined intermediate position and the deployed position.

3. The system of claim 1, wherein:
the cam comprises a first slideway;
the second coupler comprises a second slideway configured to move parallel to the predetermined path of the equipment; and
the cam follower is configured to be engaged simultaneously in the first and second slideways.

4. The system of claim 3, wherein:
the first slideway has a first portion configured to extend parallel to the predetermined path of the equipment, a second portion configured to extend orthogonally to the predetermined path of the equipment, and a curved portion configured to enable the cam follower to be guided from one to the other of the first and second portions; and
the second slideway is configured to extend orthogonally to the predetermined path of the equipment.

5. The system of claim 1, further comprising a support on which the equipment is mounted, wherein
the support comprises a hinge and
the first coupler comprises a connecting rod having a first end hinged to the hinge and a second end hinged to the cam follower.

6. The system of claim 4, further comprising a support on which the equipment is mounted, wherein:
the support comprises a hinge;
the first coupler comprises a connecting rod having a first end hinged to the hinge and a second end hinged to the cam follower, and
the hinge is arranged such that an intersection of a first line which is parallel to the second portion of the first slideway with a second line which is parallel to the first portion of the first slideway and which passes through a hinge axis of the first end of the connecting rod is offset from a hinge axis of the second end of the connecting rod in a direction from the second portion towards the first portion of the first slideway.

7. The system of claim 1, wherein:
the protection structure comprises two flaps and the at least one drive device further comprises:
  two first arms hinged jointly to the second coupler by a pivot to form the drive member; and
  two second arms having respective first end portions hinged respectively to the first arms, respective second end portions fastened respectively to the two flaps of the system, and respective middle portions hinged together to the frame in such a manner as to pivot about a common hinge axis such that the second arms are configured as a scissors mechanism.

8. The system of claim 7, wherein each of the two flaps are in a shape of a portion of a sphere.

9. An aircraft comprising at least one system according to claim 1.

10. The aircraft of claim 9, wherein the protection structure of the system is configured to close an opening arranged in a fairing of the aircraft when the protection structure is in the first position.

\* \* \* \* \*